United States Patent
Branson et al.

(10) Patent No.: US 9,218,566 B2
(45) Date of Patent: *Dec. 22, 2015

(54) DETECTING DISALLOWED COMBINATIONS OF DATA WITHIN A PROCESSING ELEMENT

(75) Inventors: Michael J. Branson, Rochester, MN (US); John M. Santosuosso, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 494 days.

This patent is subject to a terminal disclaimer.

(21) Appl. No.: 12/860,068

(22) Filed: Aug. 20, 2010

(65) Prior Publication Data

US 2012/0047101 A1 Feb. 23, 2012

(51) Int. Cl.
*G06N 5/02* (2006.01)
*G06F 17/30* (2006.01)

(52) U.S. Cl.
CPC ............ *G06N 5/02* (2013.01); *G06F 17/30348* (2013.01)

(58) Field of Classification Search
CPC ............................ G06F 17/30516; G06N 5/02
USPC .......................................................... 706/47
See application file for complete search history.

(56) References Cited

U.S. PATENT DOCUMENTS

| 5,740,441 A * | 4/1998 | Yellin et al. .................... 717/134 |
| 6,850,899 B1 | 2/2005 | Chow et al. |
| 7,735,144 B2 | 6/2010 | Pravetz et al. |
| 2004/0088191 A1 * | 5/2004 | Holden ............................ 705/2 |
| 2013/0124446 A1 | 5/2013 | Branson et al. |

FOREIGN PATENT DOCUMENTS

| CN | 1614565 A | 5/2005 |
| CN | 101697170 A | 4/2010 |
| WO | 2006127135 A2 | 11/2006 |

OTHER PUBLICATIONS

M Stonebraker et al., "The 8 Requirements of Real-Time Stream Processing", SIGMOD Record, vol. 34, No. 4, Dec. 2005, pp. 42-47.*
H. Su et al, "Automation meets algebra: A hybrid paradigm for XML stream processing", Data & Knowledge Engineering 59 (2006), pp. 576-602.*
U. Cetintemel et al., "The Aurora and Borealis Stream Processing Engines", Data Stream Management: Processing High-Speed Data Streams,, Springer-Verlag, 2006, pp. 1-23.*

(Continued)

*Primary Examiner* — Kakali Chaki
*Assistant Examiner* — Vincent Gonzales
(74) *Attorney, Agent, or Firm* — Patterson & Sheridan, LLP (57) ABSTRACT

Techniques are described for detecting disallowed combinations of data within a processing element. Embodiments of the invention may generally receive data to be processed using the processing element and determine whether the received data and a current working state violate one or more rules describing disallowed combinations of data. If a disallowed combination is detected, embodiments of the invention may handle the processing of the received data in an alternate way that prevents disallowed combinations of data within the processing element.

21 Claims, 7 Drawing Sheets

(56) References Cited

OTHER PUBLICATIONS

S. Russell and P. Norvig, Artificial Intelligence: A Modern Approach, 2nd Ed., 2003, pp. 194-374.*

Q. Wang, "Towards a Rule Model for Sefl-adaptive Software", ACM SIGSOFT Software Engineering Notes, vol. 30, No. 1, Jan. 2005, pp. 1-5.

* cited by examiner

DETECTING DISALLOWED COMBINATIONS OF DATA WITHIN A PROCESSING ELEMENT

BACKGROUND

While computer databases have become extremely sophisticated, the computing demands placed on database systems have also increased at a rapid pace. Database systems are typically configured to separate the process of storing data from accessing, manipulating, or using data stored in the database. More specifically, databases use a model where data is first stored, then indexed, and then queried. However, this model cannot meet the performance requirements of some real-time applications. For example, the rate at which a database system can receive and store incoming data can limit how much data can be processed or otherwise evaluated. This, in turn, can limit the ability of database applications to process large amounts of data in real-time.

SUMMARY

Embodiments of the invention provide a method and system for detecting disallowed combinations of data within a first processing element. The method and system include receiving data to be processed. The method and system further include identifying one or more rules describing predetermined combinations of data within the first processing element. Additionally, the method and system include determining a current working state of the first processing element, wherein the current working state comprises other data being processed on the first processing element and other data accessible by the first processing element. The method and system also include determining whether the received data and the determined current working state violate any of the one or more rules, by operation of one or more computer processors.

A second embodiment of the invention provides a computer program product for detecting disallowed combinations of data within a first processing element. The computer program product includes receiving data to be processed. The computer program product further includes identifying one or more rules describing predetermined combinations of data within the first processing element. Additionally, the computer program product includes determining a current working state of the first processing element, wherein the current working state comprises other data being processed on the first processing element and other data accessible by the first processing element. The computer program product also includes determining whether the received data and the determined current working state violate any of the one or more rules, by operation of one or more computer processors. In addition, the computer program product includes, upon determining the received data and the determined current working state do not violate any of the one or more rules, processing the received data on the first processing element.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, and often in milliseconds. Constructing an application using this type of processing has opened up a new programming paradigm that will allow for a broad variety of innovative applications, systems, and processes to be developed, as well as present new challenges for application programmers and database developers.

In a stream application, operators are connected to one another such that data flows from one processing element to the next (e.g. over a TCP/IP socket). Scalability is reached by distributing an application across nodes by creating many small executable pieces of code (operators), as well as replicating processing elements on multiple nodes and load balancing among them. Processing elements (and operators) in a stream application can be fused together to form a larger processing element. Doing so allows processing elements to share a common process space, resulting in much faster communication between operators than is available using inter-process communication techniques (e.g., using a TCP/IP socket). Further, processing elements can be inserted or removed dynamically from an operator graph representing the flow of data through the stream application, as well as fused or un-fused from a stream application during runtime.

One advantage to stream applications is that they allow the user to granularly control the process flow of data through the application. In other words, the user may designate specific operators for each processing element that perform various operations on the incoming data, and may dynamically alter the stream application by modifying the operators and the order in which they are performed. Additionally, stream applications are able to handle large volumes of data while limiting any "bottlenecks" in the processing.

However, because stream applications often deal with large volumes of data, the processing of which is spread over multiple processing elements across multiple compute nodes, this presents additional challenges for application programmers and database developers. One such challenge is preventing disallowed combinations of data from being processed using the same processing element, which may lead to improper decision making, or the appearance of impropriety. As an example, a stream application may wish to prevent a particular genetic marker for a patient from being considered in analysis of eligibility for a transplant operation. Additionally, beyond simply preventing the genetic marker from being considered in the eligibility analysis, the stream application developers may wish to prevent the decision-making component (e.g., a processing element) from even having access to the patient's genetic marker data, in order to prevent even the appearance of improper decision making.

As a second example, a disallowed combination of data for a company that performs automated stock trading may be any combination of data that may result in (or be construed as) insider trading information. Such a combination may occur between, for instance, a received set of data and other data currently accessible by the processing element. Additionally, a disallowed combination may occur between values within the received set of data itself. Furthermore, in an embodiment of the invention configured to prevent any appearance of impropriety, a disallowed combination may occur between a received set of data and other data that was recently processed by the processing element, even if the other data is no longer accessible to the processing element. As such, embodiments of the invention may be configured to prevent any improper calculations that may result in insider trading (or the appearance of inside trading), by preventing combinations of data from appearing on a processing element at the same time.

Embodiments of the invention provide techniques for identifying disallowed combinations of data on a processing element, and processing received data on the processing element only after determining that such processing would not result in a disallowed combination of data. In particular, embodiments of the invention may access rules describing disallowed combinations of data for the processing element. Additionally, embodiments of the invention may determine a current working state of a first processing element. Upon determining that a combination of the current working state and a received data element does not violate any of the one or more rules, embodiments of the invention may process the received data element on the first processing element.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the nodes used to create a stream application may be virtual machines hosted by a cloud service provider. Doing so allows a user to access this information from any computing system attached to a network connected to the cloud (e.g., the Internet).

Figure 1A:
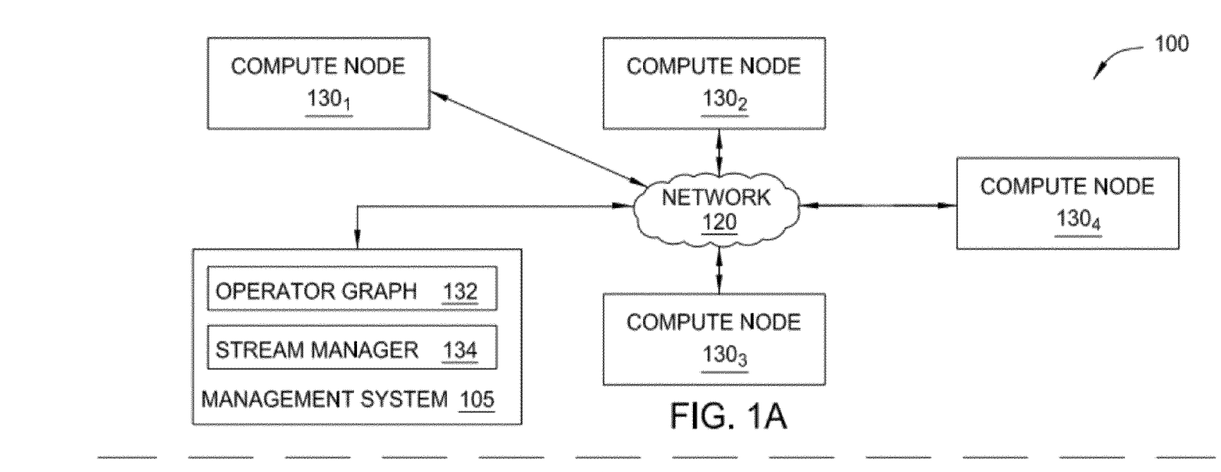
FIGS. 1A-1B illustrate a computing infrastructure 100 configured to execute a stream application, according to one embodiment of the invention.
Figure 1B:
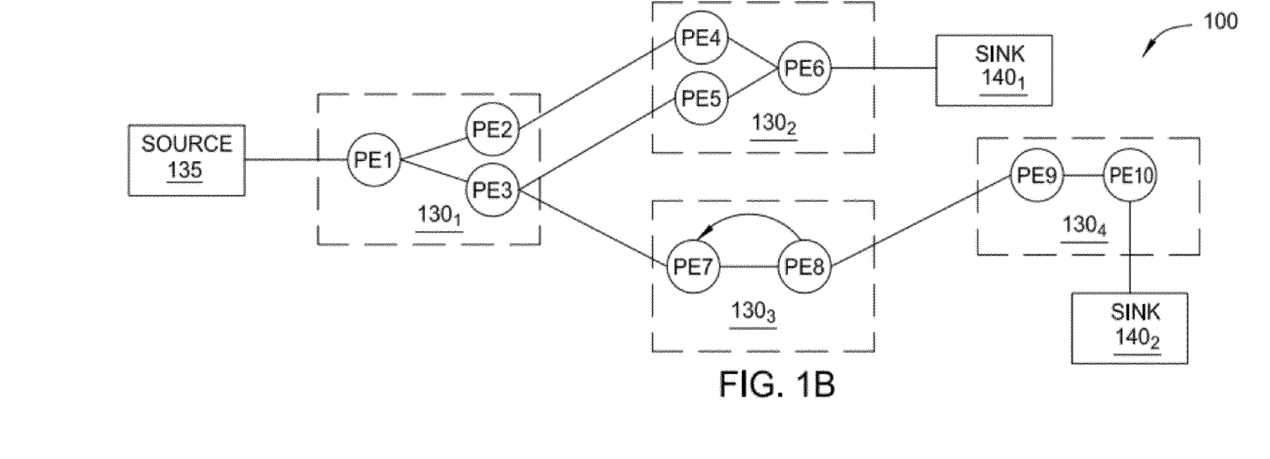

FIGS. 1A-1B illustrate a computing infrastructure 100 configured to execute a stream application, according to one embodiment of the invention. As shown, the computing infrastructure 100 includes a management system 105 and a plurality of compute nodes $130_{1-4}$, each connected to a communications network 120. Also, the management system 105 includes an operator graph 132 and a stream manager 134. As described in greater detail below, the operator graph 132 represents a stream application beginning from one or more source processing elements (PEs) through to one or more sink PEs. This flow from source to sink is also generally referred to herein as an execution path. Generally, data elements flow into a source PE of a stream application and are processed by that PE. Typically, processing elements receive an N-tuple of data elements from the stream as well as emit an N-tuple of data elements into the stream (except for a sink PE where the stream terminates). Of course, the N-tuple received by a processing element need not be the same N-tuple sent downstream. Additionally, the processing elements could be configured to receive or emit data in formats other than an N-tuple (e.g., the processing elements could exchange data marked up as XML documents). Furthermore, each processing element may be configured to carry out any form of data processing functions on the received tuple, including, for example, writing to database tables or performing other database operations such as data joins, splits, reads, etc., as well as performing other data analytic functions or operations.

The stream manager 134 may be configured to monitor a stream application running on the compute nodes $130_{1-4}$, as well as to change the structure of the operator graph 134. For example, the stream manager 134 may move processing elements (PEs) from one compute node 130 to another, for example, to manage the processing loads of the compute nodes 130 in the computing infrastructure 100. Further, stream manager 134 may control the stream application by inserting, removing, fusing, un-fusing, or otherwise modifying the processing elements (or what data-tuples flow to the processing elements) running on the compute nodes $130_{1-4}$. In one embodiment of the invention, the management system 105 may maintain multiple operator graphs 132. In such an embodiment, one operator graph 132 designated as primary operator graph, which represents the general or default processing flow, and the other operator graphs may represent alternate processing flows.

FIG. 1B illustrates an example operator graph that includes ten processing elements (labeled as PE1-PE10) running on the compute nodes $130_{1-4}$. While a processing element may be executed as an independently running process with its own process ID (PID) and memory space, multiple processing elements may also be fused to run as single process (with a PID and memory space). In cases where two (or more) processing elements are running independently, inter-process communication may occur using a network socket (e.g., a TCP/IP socket). However, when processes are fused together, the fused processing elements can use more rapid communication techniques for passing N-tuples (or other data) among processing elements (and operators in each processing element).

As shown, the operator graph begins at a source 135 (that flows into the processing element labeled PE1) and ends at sink $140_{1-2}$ (that flows from the processing elements labeled as PE6 and PE10). Compute node $130_1$ includes the processing elements PE1, PE2 and PE3. Source 135 flows into the processing element PE1, which in turn emits tuples that are received by PE2 and PE3. For example, PE1 may split data elements received in a tuple and pass some data elements to PE2, while passing other data elements to PE3. Data that flows to PE2 is processed by the operators contained in PE2, and the resulting tuples are then emitted to PE4 on compute node $130_2$. Likewise, the data tuples emitted by PE4 flow to sink PE6 $140_1$. Similarly, data tuples flowing from PE3 to PE5 also reach sink PE6 $140_1$. Thus, in addition to being a sink for this example operator graph, PE6 could be configured to perform a join operation, combining tuples received from PE4 and PE5. This example operator graph also shows data tuples flowing from PE3 to PE7 on compute node $130_3$, which itself shows data tuples flowing to PE8 and looping back to PE7. Data tuples emitted from PE8 flow to PE9 on compute node $130_4$, which in turn emits tuples to be processed by sink PE10 $140_2$.

Furthermore, although embodiments of the present invention are described within the context of a stream application, this is not the only context relevant to the present disclosure. Instead, such a description is without limitation and is for illustrative purposes only. Of course, one of ordinary skill in the art will recognize that embodiments of the present invention may be configured to operate with any computer system or application capable of performing the functions described herein. For example, embodiments of the invention may be configured to operate in a clustered environment with a standard database processing application.

Figure 2:
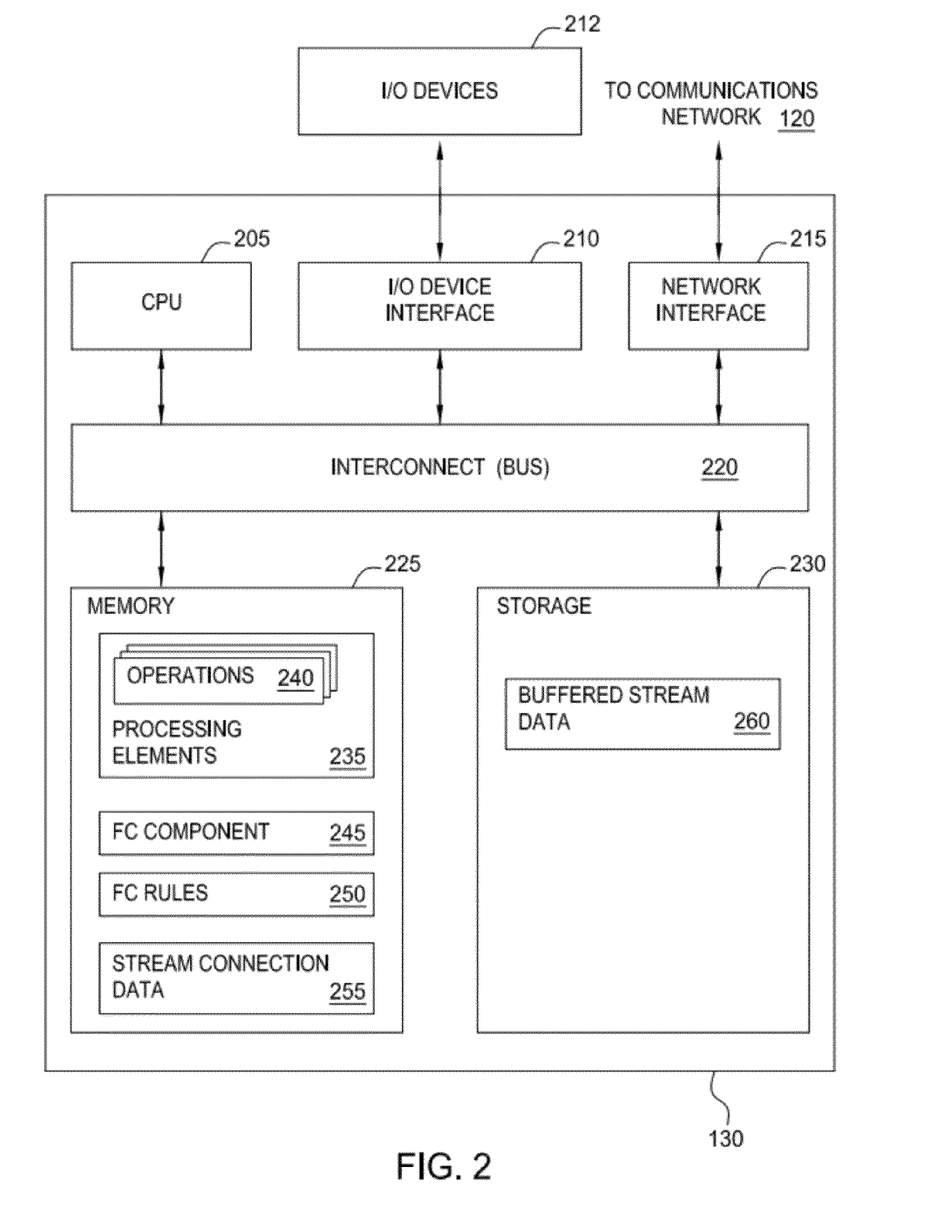
FIG. 2 is a more detailed view of the compute node 130 of FIGS. 1A-1B, according to one embodiment of the invention.

FIG. 2 is a more detailed view of the compute node 130 of FIGS. 1A-1B, according to one embodiment of the invention. As shown, the compute node 130 includes, without limitation, a central processing unit (CPU) 205, a network interface 215, an interconnect 220, a memory 225, and storage 230. The compute node 130 may also include an I/O devices interface 210 used to connect I/O devices 212 (e.g., keyboard, display and mouse devices) to the compute node 130.

The CPU 205 retrieves and executes programming instructions stored in the memory 225. Similarly, the CPU 205 stores and retrieves application data residing in the memory 225. The interconnect 220 is used to transmit programming instructions and application data between the CPU 205, I/O devices interface 210, storage 230, network interface 215, and memory 225. CPU 205 is included to be representative of a single CPU, multiple CPUs, a single CPU having multiple processing cores, and the like. And the memory 225 is generally included to be representative of a random access memory. Storage 230, such as a hard disk drive, solid state device (SSD), or flash memory storage drive, may store non-volatile data.

In this example, the memory 225 includes a plurality of processing elements (PE) 235, a disallowed combinations (FC) component 245, a plurality of FC rules 250, and stream connection data 255. Each PE 235 includes a collection of operators 240. As noted above, each operator 240 may provide a small chunk of executable code configured to process data flowing into a processing element (e.g., PE 235) and to emit data to other operators 240 in that PE and to other PEs in the stream application. Such PEs may be on the same compute node 130 or on other compute nodes accessible over the data communications network 120. The stream connection data 255 represents the connections between PEs on compute node 130 (e.g., a TCP/IP socket connection between two separate PEs 235), as well as connections to other compute nodes 130 with upstream and or downstream PEs in the stream application, also via TCP/IP sockets (or other inter-process data communication mechanisms).

As shown, storage 230 contains buffered stream data 260. The buffered stream data 260 represents a storage space for data flowing into the compute node 105 from upstream processing elements (or from a data source for the stream application). For example, buffered stream data 260 may include data tuples waiting to be processed by one of the PEs 235. Buffered stream data 260 may also store the results of data processing performed by PEs 235 that will be sent to downstream processing elements.

The FC component 245 may receive incoming tuples of a data stream to be processed on one of the PEs 235. The received tuples may be received from a source 135, or alternatively may be the output of another PE in the system 100. Upon receiving the tuple, the FC component 245 may determine a current working state of the PE 235 designated as the PE 235 to process the received tuple. Generally, as used herein, the working state of a PE 235 refers to all data accessible to a PE 235 during a period of time. For instance, the current working state of a PE 235 may include data currently being processed by the PE 235 (e.g., data included in another tuple received by the PE 235), as well as all data currently accessible by the PE 235 (e.g., stored in a database accessible by the PE 235). Additionally, the current working state may further include the information in the received tuple itself.

Additionally, in one embodiment of the invention, the current working state of a PE 235 may include data that was recently accessible to the PE 235. For example, in such an embodiment of the invention, the working state may include data that was received in the previous tuple, even though such data has already been processed by the PE 235 and is no longer accessible to the PE 235. Furthermore, in such an embodiment, a threshold time may be specified that indicates how recently data must have been accessible to the PE 235 to be included in the current working state.

Figure 3:
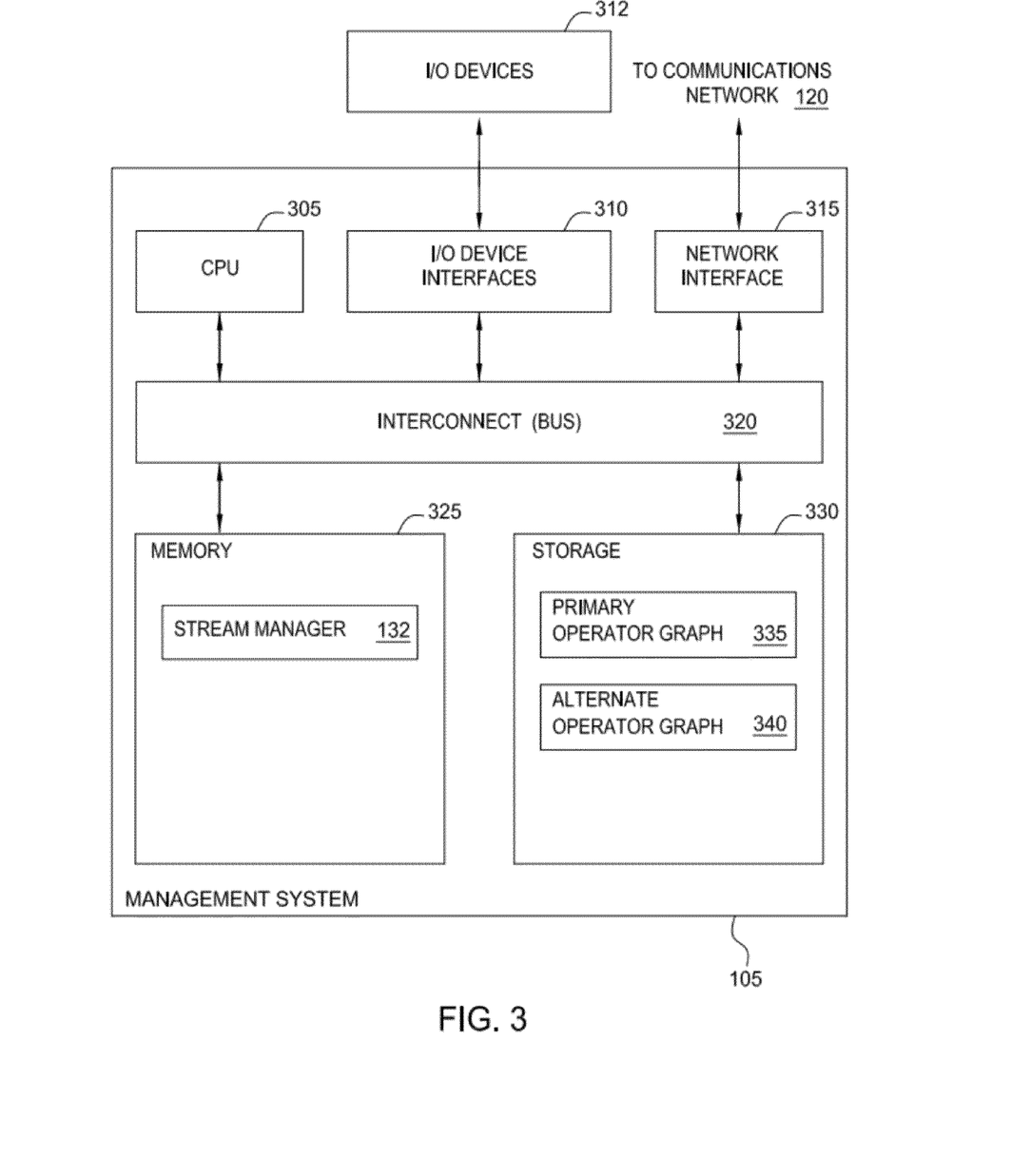
FIG. 3 is a more detailed view of the server computing system 105 of FIG. 1, according to one embodiment of the invention.

Once the current working state is determined, the FC component 245 may then use the FC rules 250 to determine whether processing the received tuple on the specified PE 235 will result in a disallowed combination of data. For example, if a combination of the received tuple of data and the current working state of the PE 235 violates at least one of the FC rules 250, the FC component 245 may determine that the processing of the tuple would result in a disallowed combination. Accordingly, the FC component 245 may take actions to prevent the disallowed combination. Such actions may include delaying the processing of the received tuple on the PE 235, sending the received tuple to another PE 235 to be processed according to an alternate execution plan, or simply discarding the received tuple. If instead the FC component 245 determines that none of the FC rules 250 are violated, the FC component 245 may send the received tuple to the appropriate PE 235 to be processed. As such, embodiments of the invention may prevent improper usage of data on a given processing element. Furthermore, embodiments may also prevent the appearance of any impropriety resulting from resulting from a disallowed combination of data being accessible on a given processing element FIG. 3 is a more detailed view of the server computing system 105 of FIG. 1, according to one embodiment of the invention. As shown, server computing system 105 includes, without limitation, a central processing unit (CPU) 305, a network interface 315, an interconnect 320, a memory 325, and storage 330. The client system 130 may also include an I/O device interface 310 connecting I/O devices 312 (e.g., keyboard, display and mouse devices) to the server computing system 105.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 120. Although shown as a single unit, the storage 330 may be a combination of fixed and/or removable storage devices, such as fixed disc drives, removable memory cards, optical storage, SSD or flash memory devices, network attached storage (NAS), or connections to storage area-network (SAN) devices.

As shown, the memory 325 stores a stream manager 132. Additionally, the storage 330 includes a primary operator graph 335 and an alternate operator graph 340. The stream manager 132 may generally route tuples received as part of a data stream to PEs 235 to be processed, according to the primary operator graph 335. As discussed above, in one embodiment of the invention, if the FC component 245 determines the combination of a received tuple and a current working state violates at least one of the FC rules 250, the FC component 245 may then route the given tuple to a second PE 235, according to an alternate execution path. In such a scenario, the alternate execution path may be specified by the alternate operator graph 240. Furthermore, in one embodiment of the invention, the EPT component 245 is further configured to notify the stream manager 132 to route all subsequently-received tuples received for the data stream to PEs 235 according the alternate operator graph 340.

Figure 4:
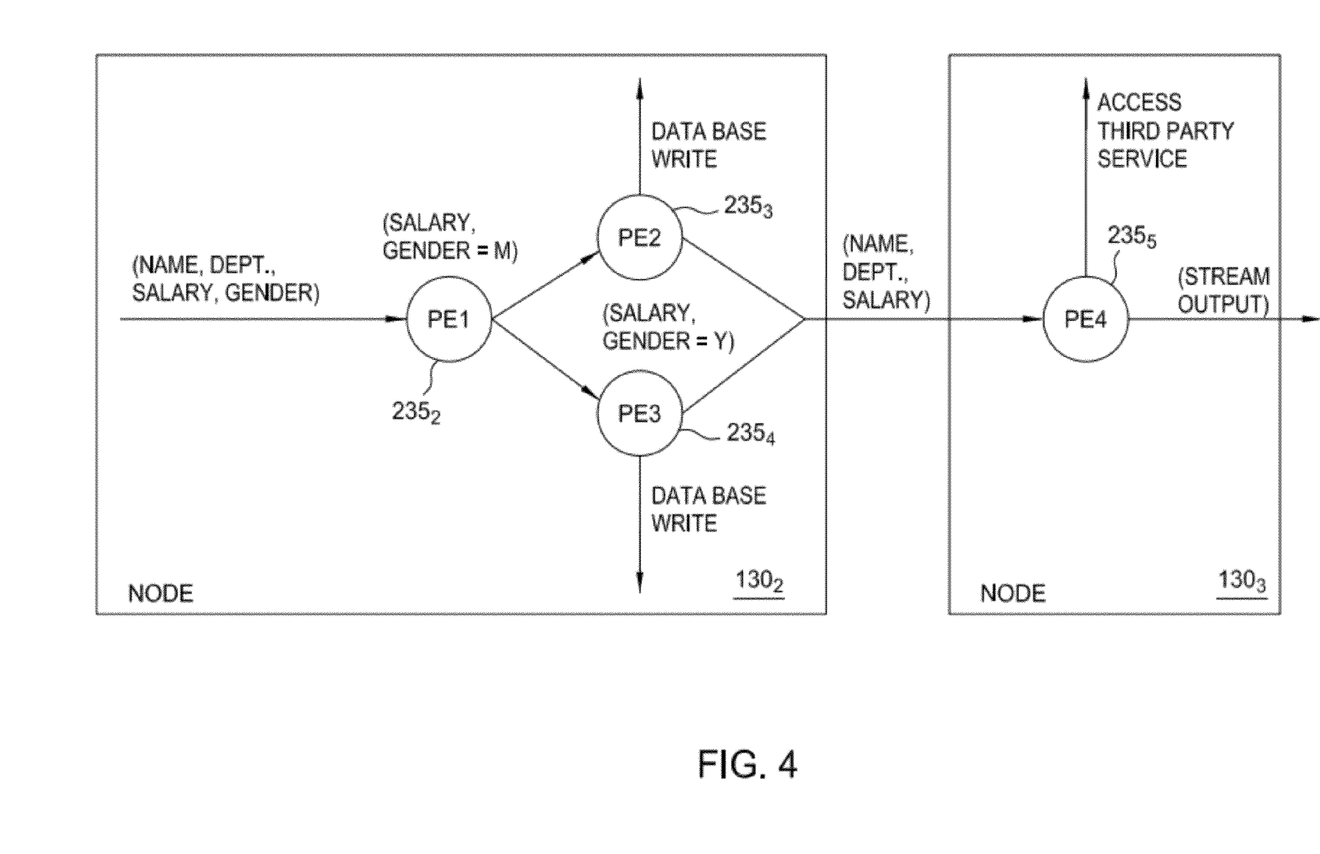
FIG. 4 illustrates an example of compute nodes in a stream application, according to one embodiment of the invention.

FIG. 4 illustrates an example of compute nodes in a stream application, according to one embodiment of the invention. As shown, compute node $130_2$ includes three processing elements $235_2$, $235_3$ and $235_4$ (labeled PE1-PE3). In the depicted example, processing element $235_2$ receives an N-tuple data stream and emits an N-tuple to processing elements $235_3$ and $235_4$ (labeled PE2 and PE3, respectively) on compute node $130_3$. Processing elements PE2 and PE3, in turn, emit N-tuples to processing element $235_5$ on compute node $130_3$. In this example, the PE 135 (labeled PE1), receives a tuple which includes attributes <name, department, salary, gender>. PE1 takes this N-tuple and generates one set of tuples sent to PE2 and another set of tuples sent to PE3, based on the gender value in a tuple received by PE1. In turn, PE2 and PE3 perform a database write for each tuple received from PE1 and generate a tuple of attributes <name, department, salary> sent to PE4. Once received, PE4 accesses a third-party web service and generates a tuple sent further downstream in the stream application.

Continuing the example, the depicted stream application may be an automated salary application that automates the processing of bonuses for all employees of a business. However, assume that because of a public outcry about executive compensation, a business wishes to manually process the bonuses for all employees from the department "EXECUTIVE" and whose salary is over $200,000. Thus, the stream application developers may create an FC rule 250 that specifies a disallowed combination of data on PE1 where the "DEPT." attribute contains a value of "EXECUTIVE" and the "SALARY" attribute contains a value greater than "200000." If the FC component 245 then receives a tuple containing values <Jane Doe, EXECUTIVE, 300000, F>, the FC component 245 may determine that the processing of this tuple on PE1 would violate the aforementioned FC rule 250.

Upon determining that the processing of the tuple would violate at least one of the FC rules 250, embodiments of the invention may prevent the processing of the received tuple using the processing element. Instead, the FC component 245 may redirect the received tuple to be processed using an alternate execution path (e.g., using another PE 235). In yet another embodiment, the received tuple may be simply discarded and not processed. For example, if the stream application developers know that executive bonuses are processed manually and separate from the other employees, the FC component 245 may be configured to discard all tuples which, if processed, would violate the FC rule 250 specifying the "DEPT." attribute contains a value of "EXECUTIVE" and the "SALARY" attribute contains a value greater than "200000."

By preventing the processing of the received tuple on the processing element when a disallowed combination of data is detected, embodiments of the invention may prevent a situation where disallowed combinations of data are used for improper means. As another example, embodiments of the invention may be used to prevent a patient's genetic indicator for a certain condition from being used in determining whether the patent qualifies for an organ transplant. Furthermore, embodiments of the invention may not only prevent the actual usage of the indicator (i.e., actual impropriety), but may also prevent the appearance of any impropriety. That is, even if the data on the patient's genetic indicator is not used in the determination of whether the patient qualifies for an organ transplant, the business may wish for the genetic indicator data to not even be available to the processing element making the qualification decision. By ensuring that the processing element cannot access the genetic indicator data, embodiments of the invention ensure that even the appearance of any improper decision making is prevented.

Figure 5:
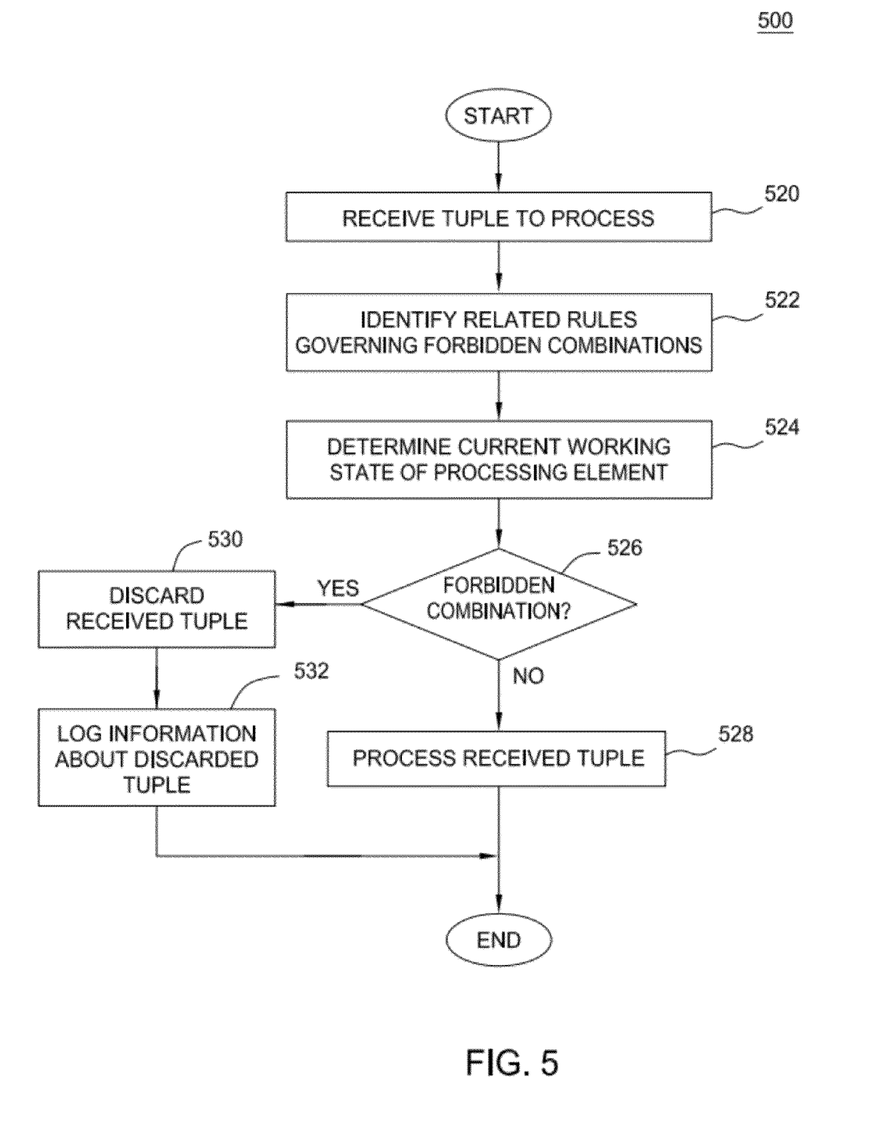
FIG. 5 is a flow diagram illustrating a method of preventing disallowed combinations of data on a processing element, according to one embodiment of the invention.

FIG. 5 is a flow diagram illustrating a method 500 of preventing disallowed combinations of data on a processing element 235, according to one embodiment of the invention. As shown, the method 500 begins at step 520, where the FC component 245 receives a tuple of data to process using a specified processing element 235. Upon receiving the tuple of data, the FC component 245 identifies any related FC rules 250 identifying disallowed combinations of data for the specified processing element 235 (step 522). Once the FC component 245 identifies any relevant FC rules 250, the FC component 245 determines a current working state of the specified processing element 235 (step 524).

The FC component 245 then determines whether processing the received tuple of data using the PE 235 would result in a disallowed combination of data (step 526). If the FC component 245 determines the processing would not result in a disallowed combination, the FC component 245 sends the received tuple to the specified processing element 235 to be processed (step 528). If, however, the FC component 245 determines the processing would result in a disallowed combination of data on the processing element 235, the FC component 245 discards the received tuple (step 530). Once the tuple is discarded, the FC component 245 then logs information about the discarded tuple (step 532). Once the tuple is discarded and the information about the tuple is logged, or alternatively once the received tuple is processed using the processing element, the method 500 ends.

As discussed above, rather than discarding the received tuple, the FC component 245 may handle the received tuple in other ways. For example, in one embodiment of the invention, the FC component 245 may replace values in the received tuple with a placeholder value, and then send the modified tuple on to the processing element to be processed. For example, assume that a business wishes to prevent a processing element from considering (or being able to consider) a patient's genetic indicator for a particular trait in determining whether the patient qualifies for an organ transplant. As such, when a tuple is received containing patient data, the FC component 245 may replace any attributes in the tuple describing the genetic indicator with a placeholder value, indicating that a substitution was made. Once the indicator data is replaced with placeholder values, the FC component 245 may determine an updated working state of the processing element, and then determine whether the modified tuple and the updated working state violate any of the FC rules 250. If the FC component 245 determines that none of the rules are violated, the FC component 245 may send the modified tuple to the processing element for processing.

In another embodiment of the invention, rather than discarding the received tuple, the FC component 245 may instead send the received tuple to another processing element to be processed, according to an alternate execution path. For instance, following the example discussed above, assume that because of a public outcry about executive compensation, a business wishes to manually process the bonuses for all employees from the department "EXECUTIVE" and whose salary is over $200,000. In such a case, the business may create a FC rule 250, preventing an automated payroll program running on a processing element from processing the employee data where the "DEPT." attribute has the value "EXECUTIVE" and the "SALARY" attribute has a value over $200,000. If the FC component 245 then determines that a received tuple of data violates the aforementioned FC rule 250, the FC component 245 may prevent the tuple from being processed on the processing element, and may instead redirect the tuple to another processing element according to an alternate execution path. Thus, in the example, the FC component 245 may send the received tuple to a processing element designated specifically for processing executive salaries.

In yet another embodiment of the invention, rather than discarding the received tuple, the FC component 245 may send the received tuple to the processing element for processing, but may restrict what actions the processing element may take. Thus, for example, assume the processing element normally executes two operations on incoming tuples: a first operation that accesses a database and a second operation that accesses a third party service. Furthermore, assume that the received tuple and the first operation that accesses the database would create a forbidden combination. Thus, in this example, the FC component 245 may send the received tuple to the processing element, but may restrict the processing element to only execute the second operation when processing the tuple. In this way, the FC component 245 can avoid interrupting the normal operational flow of the stream application, while still preventing forbidden combinations of data within a processing element.

Figure 6:
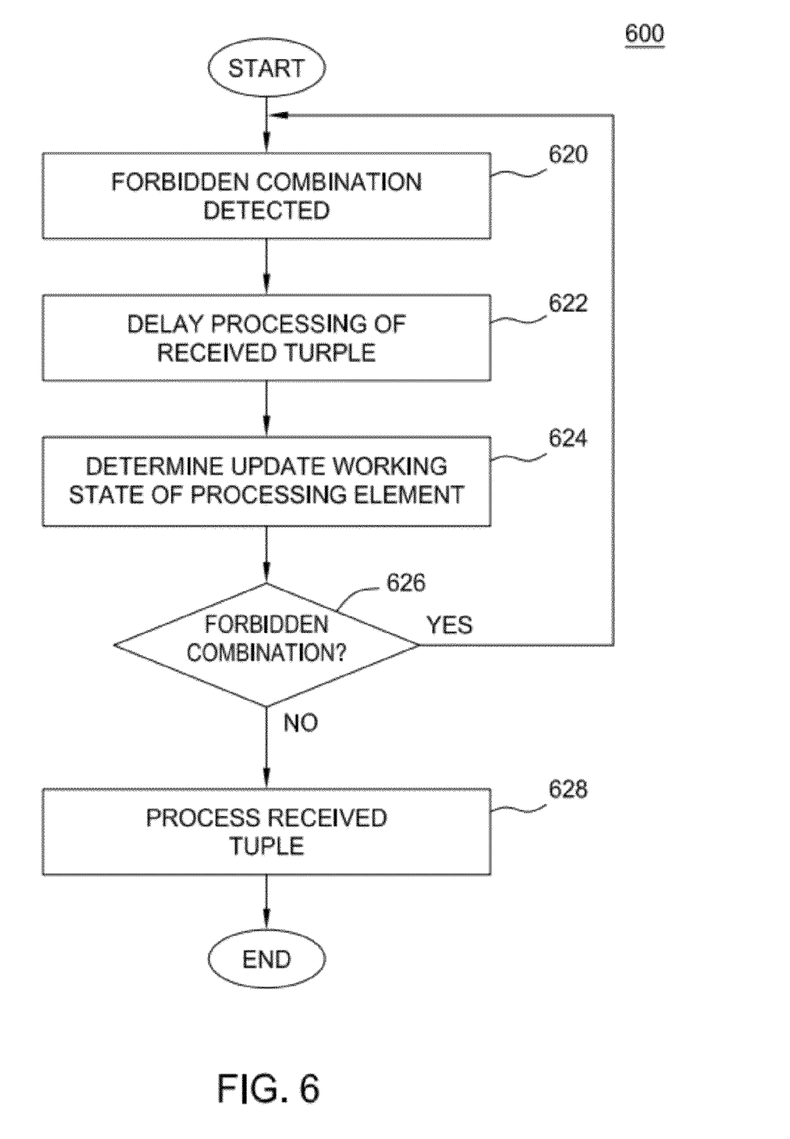
FIG. 6 is a flow diagram illustrating a method of preventing disallowed combinations of data on a processing element, according to one embodiment of the invention.

FIG. 6 is a flow diagram illustrating a method of preventing disallowed combinations of data on a processing element, according to one embodiment of the invention. As shown, the method 600 begins at step 620, where the FC component 245 determines that a disallowed combination would occur if the specified processing element were to process the received tuple of data. For example, the FC component 245 may make such a determination at step 526 of the previous method 500. Upon detecting that a disallowed combination would occur if the received tuple is processed, the FC component 245 delays the processing of the received tuple on the processing element (step 622). In one embodiment of the invention, the amount of time that the processing is delayed is a predetermined fixed amount of time. In another embodiment of the invention, the FC component 245 calculates the amount of time based on any number of factors. Exemplary factors that the FC component 245 may consider include, without limitation, which FC rule 250 was violated to trigger the disallowed combination, the values contained in the received tuple, metadata collected about the received tuple, as well as various external factors (e.g., the time of day, the rate at which tuples are received, etc.).

Once the FC component 245 delays the processing of the received tuple, the FC component 245 then determines an updated working state of the specified processing element (step 624). Additionally, in the depicted embodiment, the FC component 245 determines whether a disallowed combination will occur if the received tuple is processed on the specified processing element (step 626). The FC component 245 may base the decision on whether a combination of the received tuple and the updated working state of the specified processing element would violate any of the FC rules 250. If the FC component 245 determines this processing would result in a disallowed combination, the method begins again at step 620, as the FC component 245 again has detected a disallowed combination of data. If, instead, the FC component 245 determines that the combination would not violate any of the FC rules 250, the FC component 245 sends the received tuple to the specified processing element to be processed (step 628). Once the processing element processes the received tuple, the method 600 ends.

Advantageously, the method 600 prevents disallowed combinations of data within a processing element, while avoiding redirecting (e.g., to another processing element specified by an alternate execution path) or discarding received tuples of data, the processing of which would violate at least one of the FC rules 250. For example, assume that a processing element receives a first tuple of data and stores the values contained in the first tuple. Furthermore, assume that the processing element deletes stored values after some amount of time. If the processing element then receives a second tuple of data, and if the FC component 245 determines that the combination of the second tuple and the stored values would violate at least one of the FC rules 250, the FC component 245 may delay the processing of the second tuple on the processing element until the stored values are deleted. As such, the FC component 245 avoids the disallowed combination of data on the processing element.

Figure 7:
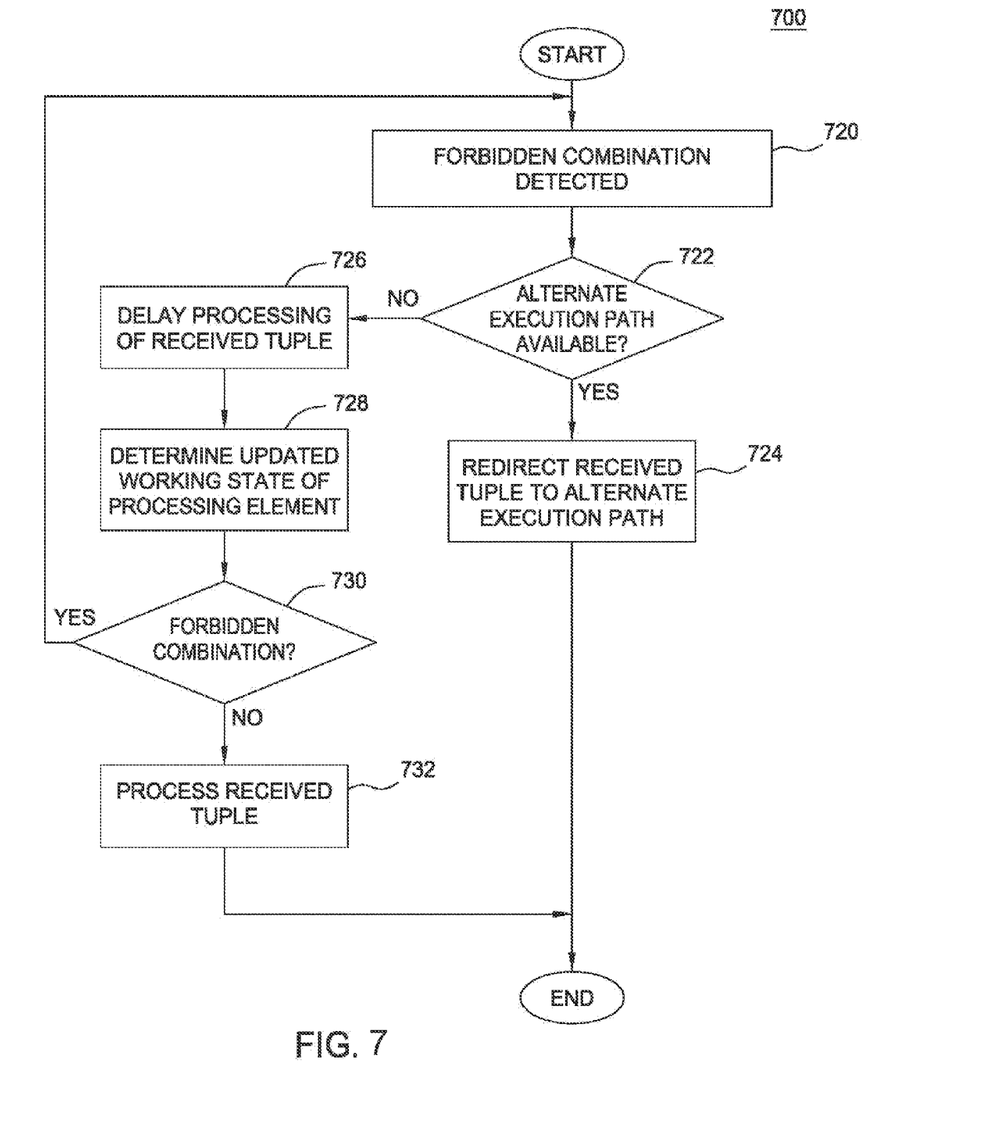
FIG. 7 is a flow diagram illustrating a method of preventing disallowed combinations of data on a processing element, according to one embodiment of the invention.

As described above, the FC component 245 may be configured to perform various actions when a potential disallowed combination is detected. In certain embodiments of the invention, these actions may be combined, so that multiple actions are performed when a potential disallowed combination is detected. FIG. 7 is a flow diagram illustrating a method of preventing disallowed combinations of data on a processing element, according to one embodiment of the invention. As shown, the method 700 begins at step 720, where the FC component 245 determines that a disallowed combination would occur if the specified processing element were to process the received tuple of data. For example, the FC component 245 may make such a determination at step 526 of the method 500 discussed above. Upon detecting that a disallowed combination would occur if the received tuple is processed, the FC component 245 determines whether an alternate execution path is available for processing the received tuple of data (step 722). For example, the FC component 245 may query the stream manager 132 on the management system 105 to determine whether an alternate operator graph 340 is available to process the received tuple.

If the FC component 245 determines that an alternate execution path is available for processing the received tuple of data, the FC component 245 redirects the received tuple to the processing element specified in the alternate execution path to process the received tuple (step 724). If, instead, the FC component 245 determines no alternate execution path is available, the FC component 245 delays the processing of the received tuple on the processing element (step 726). As discussed above, the amount of time that the processing is delayed may be a predetermined amount of time, or may be a calculated amount of time.

Once the FC component 245 delays the processing of the received tuple, the FC component 245 determines an updated working state of the specified processing element (step 728). The FC component 245 then determines whether a disallowed combination will occur if the received tuple is processed on the specified processing element (step 730). The FC component 245 may base the decision on whether a combination of the received tuple and the updated working state of the specified processing element would violate any of the FC rules 250. If the FC component 245 determines this processing would result in a disallowed combination, the method begins again at step 620, as the FC component 245 again has detected a disallowed combination of data. If, instead, the FC component 245 determines that the combination would not violate any of the FC rules 250, the FC component 245 sends the received tuple to the specified processing element to be processed (step 628). Once the processing element processes the received tuple, the method 600 ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system, comprising:
   one or more computer processors; and
   a memory containing:
      a plurality of processing elements, each comprising a respective one or more operators, wherein each operator is configured to perform a respective processing operation for incoming data in a stream computing environment; and
      a program distinct from the plurality of processing elements that, when executed on the one or more computer processors, performs an operation for detecting disallowed combinations of data within a first processing element, comprising:
         receiving data to be processed on the first processing element, before the first processing element can access the data;
            determining whether the received data violates any of a plurality of rules, each describing a respective predetermined combination of data that is not allowed to be accessible within the first processing element, based on whether the received data and a current working state of the first processing element match a predetermined combination of data categories described by at least a first one of the plurality of rules, wherein the current working state specifies both other data being processed on the first processing element and other data accessible by the first processing element; and
         upon determining that the received data does not violate any of the plurality of rules, sending the received data to the first processing element to be processed.

2. The system of claim 1, the operation comprising:
   upon determining that the combination of the received data and the determined current working state violates at least one of the one or more rules, sending the received data to a second processing element.

3. The system of claim 2, wherein the received data is part of a data stream, and the operation further comprising:
   upon determining that the combination of the received data and the determined current working state violates at least one of the one or more rules, sending all subsequently received data from the data stream to the second processing element.

4. The system of claim 1, the operation further comprising:
   upon determining that the combination of the received data and the determined current working state violates at least one of the one or more rules, discarding the received data.

5. The system of claim 1, the operation further comprising:
   upon determining that the combination of the received data and the determined current working state violates at least one of the one or more rules, delaying the sending of the received data to the first processing element for a predetermined amount of time.

6. The system of claim 5, the operation further comprising:
   determining an updated working state of the first processing element, wherein the updated working state comprises other data being processed on the first processing element and other data accessible by the first processing element; and
   upon determining that the combination of the received data and the determined updated working state does not violate any of the one or more rules, sending the received data to the first processing element to be processed.

7. The system of claim 1, the operation further comprising:
   upon determining that the combination of the received data and the determined current working state violates at least one of the one or more rules, modifying the received data by replacing at least one value in the received data with a placeholder value; and
   sending the modified data to the first processing element.

8. The system of claim 1, wherein the determined current working state further comprises recent data that was recently accessible to the first processing element, and wherein the recent data is no longer accessible to the first processing element.

9. The system of claim 1, the operation further comprising:
   upon determining the received data and the determined current working state do not violate any of the one or more rules, processing the received data on the first processing element.

10. The system of claim 1, the operation further comprising:
    upon determining that the combination of the received data and the determined current working state violates at least one of the one or more rules:
       restricting one or more operations associated with processing the data on the first processing node; and
       sending the received data to the restricted first processing node.

11. The system of claim 1, wherein the stream computing environment further comprises an operator graph that defines a path for incoming data through the operators.

12. A computer program product for detecting disallowed combinations of data within a first processing element, comprising:
    a computer-readable storage medium having computer readable program code embodied therewith, distinct from the plurality of processing elements, the computer readable program code comprising:
  computer readable program code to receive data to be processed on a first processing element of a plurality of processing elements, before the first processing element accesses the data, wherein each of the plurality of processing elements comprises a respective one or more operators, wherein each operator is configured to perform a respective processing operation for incoming data in a stream computing environment;
  computer readable program code to determine whether the received data violates any of a plurality of rules, each describing a respective predetermined combination of data that is not allowed to be accessible within the first processing element, based on whether the received data and a current working state of the first processing element match a predetermined combination of data categories described by at least a first one of the plurality of rules, wherein the current working state specifies both the other data being processed on the first processing element and other data accessible by the first processing element; and
  computer readable program code to, upon determining that the received data does not violate any of the plurality of rules, send the received data to the first processing element to be processed.

13. The computer program product of claim 12, further comprising:
  computer readable program code to, upon determining that the combination of the received data and the determined current working state violates at least one of the one or more rules, send the received data to a second processing element.

14. The computer program product of claim 13, wherein the received data is part of a data stream, and further comprising:
  computer readable program code to, upon determining that the combination of the received data and the determined current working state violates at least one of the one or more rules, send all subsequently received data from the data stream to the second processing element.

15. The computer program product of claim 12, further comprising:
  computer readable program code to, upon determining that the combination of the received data and the determined current working state violates at least one of the one or more rules, discard the received data.

16. The computer program product of claim 12, further comprising:
  computer readable program code to, upon determining that the combination of the received data and the determined current working state violates at least one of the one or more rules, modify the received data by replacing at least one value in the received data with a placeholder value; and
  computer readable program code to send the modified data to the first processing element.

17. The computer program product of claim 12, further comprising:
  computer readable program code to, upon determining that the combination of the received data and the determined current working state violates at least one of the one or more rules, delay the sending of the received data to the first processing element for a predetermined amount of time.

18. The computer program product of claim 17, further comprising:
  computer readable program code to determine an updated working state of the first processing element, wherein the updated working state comprises other data being processed on the first processing element and other data accessible by the first processing element; and
  computer readable program code to, upon determining that the combination of the received data and the determined updated working state does not violate any of the one or more rules, send the received data to the first processing element to be processed.

19. The computer program product of claim 12, wherein the determined current working state further comprises recent data that was accessible to the first processing element within a predefined period of time, and wherein the recent data is no longer accessible to the first processing element.

20. The computer program product of claim 12, wherein the stream computing environment further comprises an operator graph that defines a path for incoming data through the operators.

21. The computer programming product of claim 12, the operation further comprising:
  computer readable program code to, upon determining that the combination of the received data and the determined current working state violates at least one of the one or more rules:
    restrict one or more operations associated with processing the data on the first processing node; and
    send the received data to the restricted first processing node.

* * * * *